US010769625B2

(12) United States Patent
Pandiarajan et al.

(10) Patent No.: US 10,769,625 B2
(45) Date of Patent: Sep. 8, 2020

(54) DYNAMIC GENERATION OF QUICK RESPONSE (QR) CODES FOR SECURE COMMUNICATION FROM/TO A MOBILE DEVICE

(71) Applicant: CELLCO PARTNERSHIP, Basking Ridge, NJ (US)

(72) Inventors: Vijayakumar Pandiarajan, Canton, MI (US); William Dakota Commons, Pennington, NJ (US); Siva Patnam, Edison, NJ (US); Jayant Ghoshal, Hillsborough, NJ (US); Ramakrishna Kannamangalam, Piscataway, NJ (US)

(73) Assignee: CELLCO PARTNERSHIP, Basking Ridge, NJ (US)

( * ) Notice: Subject to any disclaimer, the term of this patent is extended or adjusted under 35 U.S.C. 154(b) by 1226 days.

(21) Appl. No.: 14/137,710

(22) Filed: Dec. 20, 2013

(65) Prior Publication Data
US 2015/0178721 A1   Jun. 25, 2015

(51) Int. Cl.
G06Q 20/38 (2012.01)
G06K 19/06 (2006.01)
G06Q 30/02 (2012.01)
G06Q 20/32 (2012.01)

(52) U.S. Cl.
CPC ..... *G06Q 20/382* (2013.01); *G06K 19/06037* (2013.01); *G06K 19/06112* (2013.01); *G06Q 20/3274* (2013.01); *G06Q 20/3276* (2013.01); *G06Q 30/0281* (2013.01)

(58) Field of Classification Search
None
See application file for complete search history.

(56) References Cited

U.S. PATENT DOCUMENTS

| 5,001,754 | A | * | 3/1991 | Deffeyes | H04L 9/0656 380/46 |
|---|---|---|---|---|---|
| 2006/0025222 | A1 | * | 2/2006 | Sekine | G07F 17/32 463/42 |
| 2008/0091614 | A1 | * | 4/2008 | Bas Bayod | G06Q 20/04 705/71 |
| 2008/0243702 | A1 | * | 10/2008 | Hart | G06O 20/3672 705/66 |

(Continued)

OTHER PUBLICATIONS

EcoATM, How it Works, http://www.ecoatm.com, 2013.
(Continued)

*Primary Examiner* — Steven S Kim
*Assistant Examiner* — Timothy Paul Sax

(57) ABSTRACT

Dynamically generated quick response (QR) codes are used for secure communication to/from mobile devices. In one example, a QR code identifies a product or service selected by a user using a mobile device. The mobile device generates the QR code identifying the user's selection, and displays the QR code for reading by a retail kiosk. The retail kiosk, such as movie-rental kiosk, extracts the product or service selection encoded in QR code and provides the identified product or service to the user. The QR code can additionally identify a user account, such that payment for the product or service is automatically charged to the account identified from the QR code. In another example, the QR code is used to transfer money and/or credits between a user and a retailer, or between two users.

20 Claims, 7 Drawing Sheets

(56) References Cited

U.S. PATENT DOCUMENTS

| | | | | |
|---|---|---|---|---|
| 2008/0244721 | A1* | 10/2008 | Barrus | G06F 21/6254 726/9 |
| 2009/0071972 | A1* | 3/2009 | Peyran | G06Q 30/00 221/8 |
| 2009/0248538 | A1* | 10/2009 | Taylor | G06Q 20/02 705/26.1 |
| 2010/0049615 | A1* | 2/2010 | Rose | G06Q 20/02 705/17 |
| 2011/0001995 | A1* | 1/2011 | Sato | G06F 21/608 358/1.11 |
| 2012/0096277 | A1* | 4/2012 | Perez Soria | G06Q 20/3274 713/179 |
| 2012/0124365 | A1* | 5/2012 | Black | G07F 7/00 713/150 |
| 2012/0164990 | A1* | 6/2012 | Amora | G06Q 10/02 455/414.1 |
| 2012/0253913 | A1* | 10/2012 | Richard | G06Q 20/322 705/14.27 |
| 2012/0278616 | A1* | 11/2012 | Stevens | H04L 9/0861 713/165 |
| 2013/0013390 | A1* | 1/2013 | Paulson-Ellis | G06Q 30/0268 705/14.38 |
| 2013/0024299 | A1* | 1/2013 | Wong | G06Q 30/06 705/15 |
| 2013/0035787 | A1* | 2/2013 | Canter | G07F 11/00 700/232 |
| 2013/0111208 | A1* | 5/2013 | Sabin | H04W 4/00 713/171 |
| 2013/0159699 | A1* | 6/2013 | Torkkel | G06F 21/6245 713/155 |
| 2013/0166441 | A1* | 6/2013 | Kobylkin | G06Q 20/354 705/39 |
| 2013/0219479 | A1* | 8/2013 | DeSoto | H04W 12/06 726/6 |

OTHER PUBLICATIONS

Media Center, www.redbox.com/facts, pp. 1-2, Dec. 19, 2013.
LevelUp.: Pay with your phone., https://www.thelevelup.com, pp. 1-4, Dec. 19, 2013.
Redbox Operator Coinstar Tries Coffee Dispensers—Bloomberg Businessweek, Companies & Industries, www.businessweek.com/printer/articles/76930-rebbox-operator-coinstar-tries-coffee-disoensers, pp. 1-2, Dec. 19, 2013.
What is LevelUp and how do I pay with it?—Help center, https://levelup.zendesk.com/hc/en-us/articles/200288027-What-is-LevelUp-and-how-do-I-pay-with-it, Dec. 19, 2013.

* cited by examiner

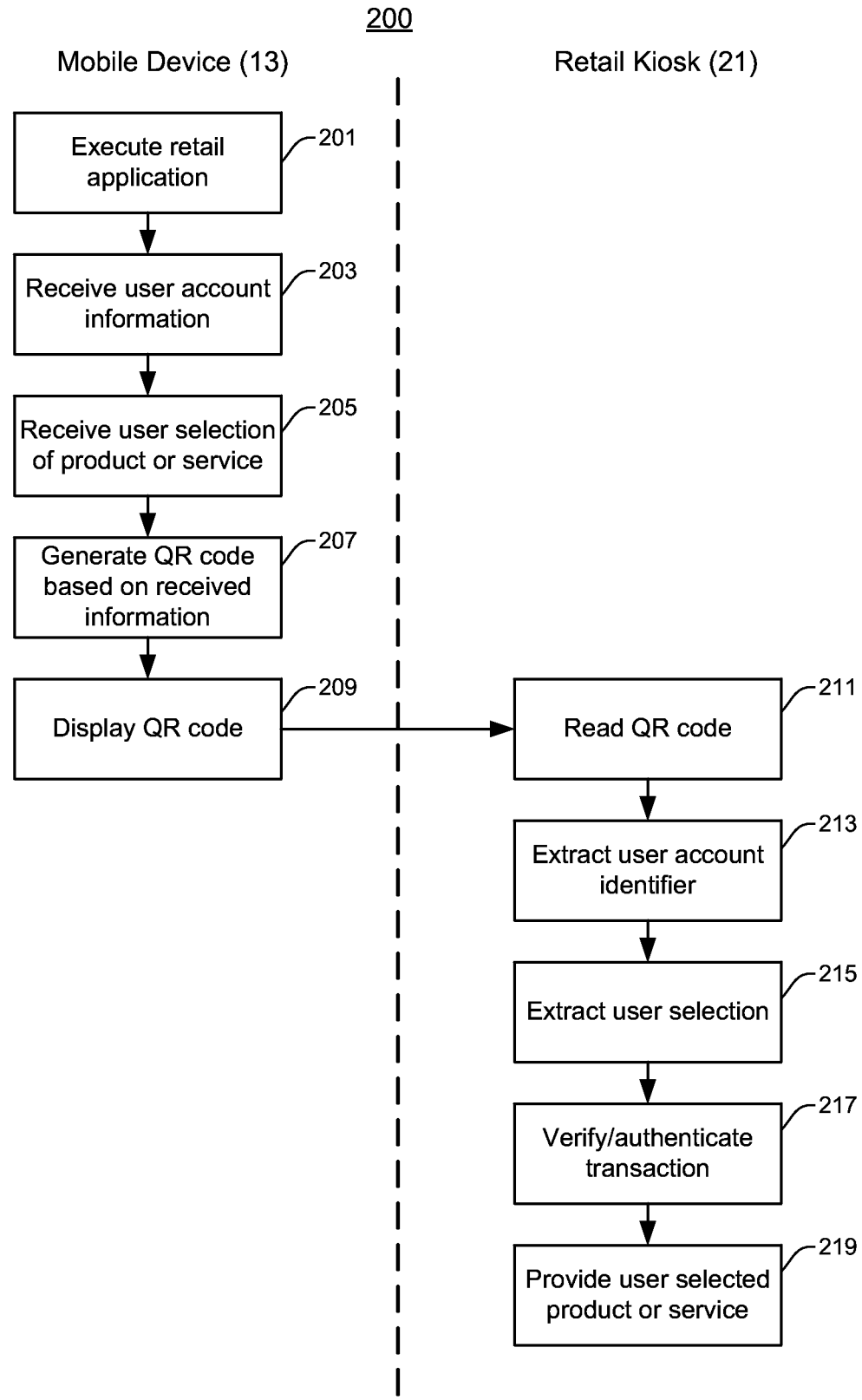

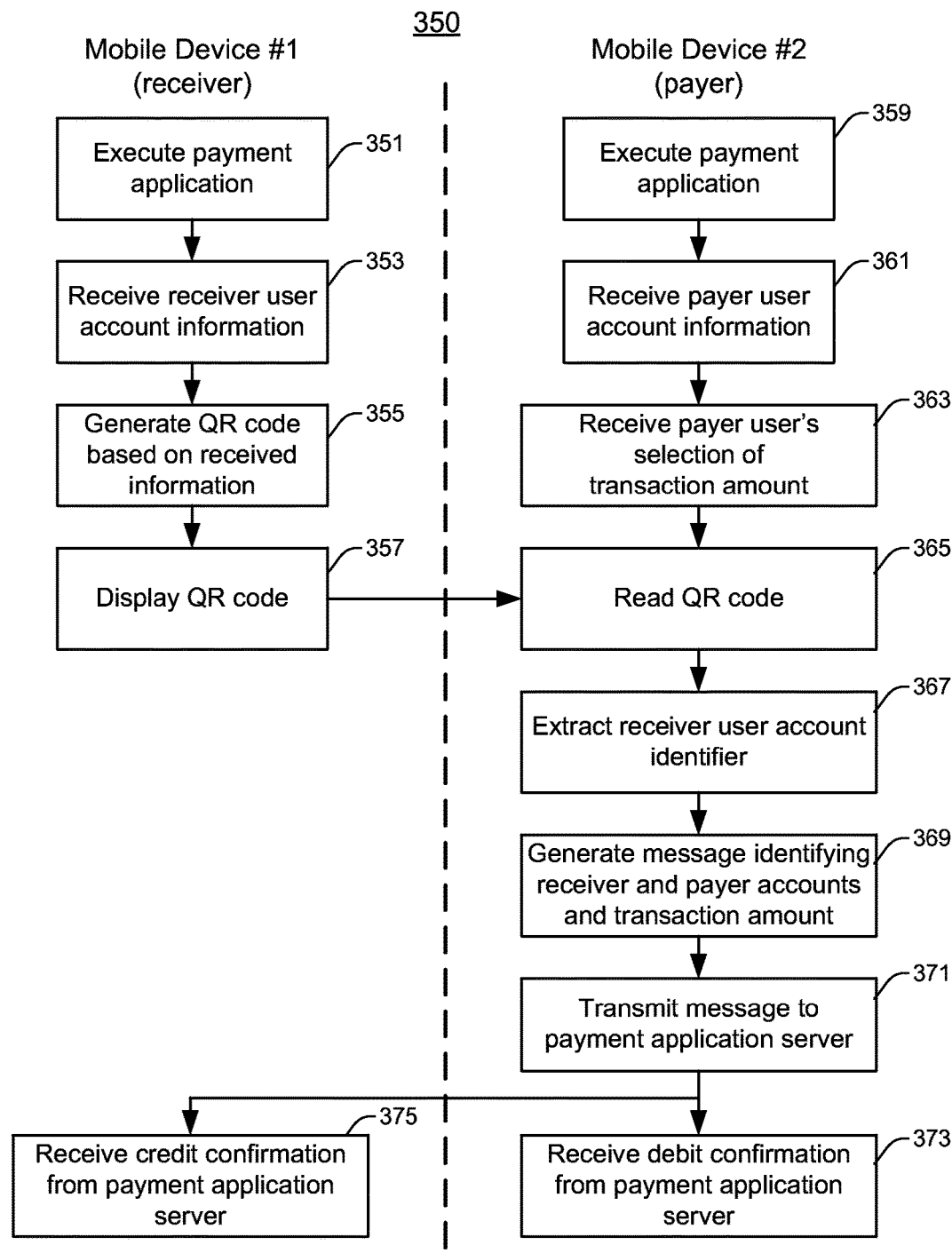

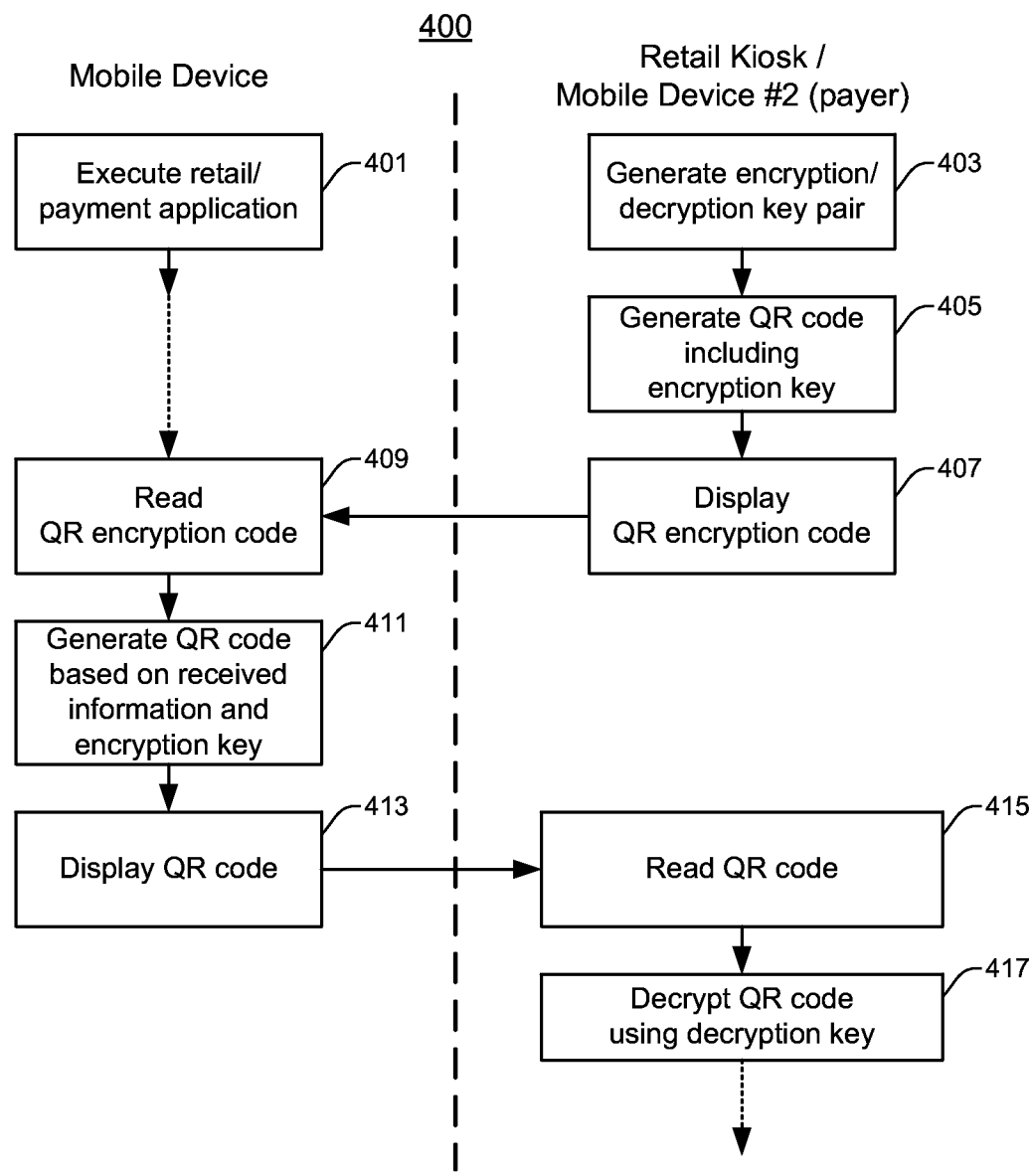

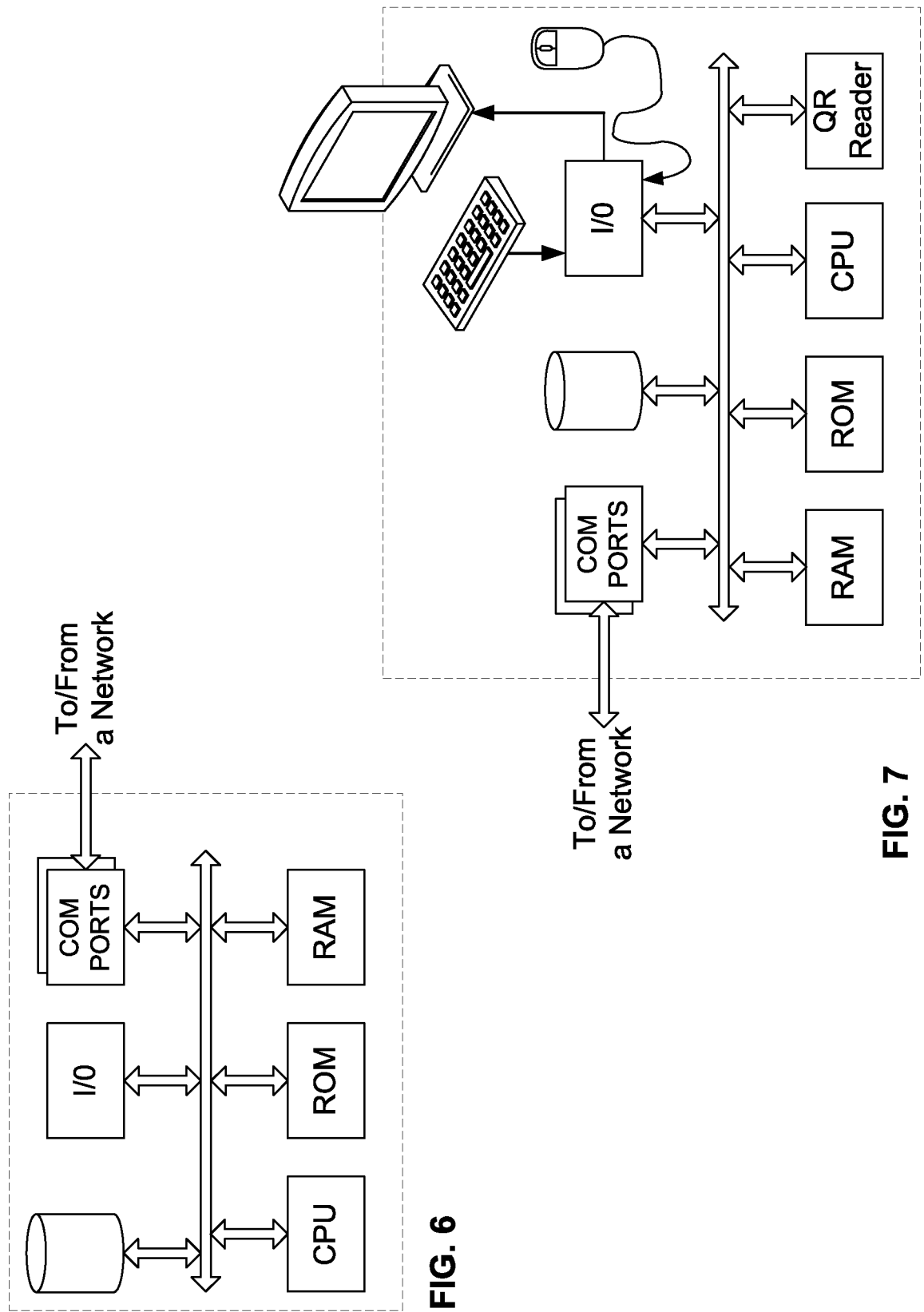

DYNAMIC GENERATION OF QUICK RESPONSE (QR) CODES FOR SECURE COMMUNICATION FROM/TO A MOBILE DEVICE

BACKGROUND

Mobile devices such as smartphones and tablet computers are being put to an increasing variety of uses. Smartphones are generally used for mobile wireless communication applications, such as placing and receiving voice calls, sending and receiving mobile messages (e.g. text and/or multimedia), and accessing email, the Internet and other services relying on data communications. Some small-sized tablet computers are now being configured for communication through mobile wireless networks, and for messaging and data services similar to those of smartphones.

In addition to communicating through mobile wireless communication networks, the devices are configured for short-range wireless communications using Bluetooth and/or near-field communication (NFC). In particular, mobile payment systems are being rolled out in which mobile device users can pay for purchases using smartphones or tablet computers. The mobile payment systems typically rely on NFC communication between a mobile device and a payment terminal. However, NFC communications are susceptible to eavesdropping. An eavesdropping device located within communication range of an NFC transmitter can listen to and record NFC-based communications, and could potentially use the recorded information to perform fraudulent payments. The eavesdropping device can be located out of sight of the NFC transmitter, such as in a hidden location, and nonetheless listen to and record NFC communications.

Quick-response (QR) codes are two-dimensional bar codes that can encode information. QR codes are commonly located on printed advertisements, and enable users to access additional information relating to an advertised product. QR codes are typically static: they encode a particular piece of information, and do not change over time. QR codes can be read by mobile devices having a QR-reader application and a camera. A user can thus access additional content relating to an advertisement by scanning the QR code with the mobile device's camera. The QR-reader application running on the mobile device decodes the QR code scanned by the camera, and extracts a universal resource locator (URL) or other web-address encoded within the QR code, and retrieves the additional information using the URL.

The reading of a QR code requires a direct line-of-sight between the QR code and the QR reader/camera, to enable the reader/camera to obtain an image of the code. As such, a user can limit access to a QR code by monitoring lines-of-sight to the QR code. In at least this respect, QR codes cannot readily be eavesdropped upon by devices not visible to the user. A QR code can thus be kept secure by limiting the period of time it is displayed or exposed, and/or monitoring the line-of-sight to the QR code.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 is a flow diagram illustratively showing steps of a method for dynamically generating of a QR code for secure communication to/from a mobile device.

FIG. 3B is a flow diagram illustratively showing steps of a method for dynamically generating of a QR code for securely transferring money and/or credits between two mobile device users.

FIG. 4 is a flow diagram illustratively showing steps of a method for using an encrypted QR code for securely communicating to/from a mobile device.

FIG. 6 is a simplified functional block diagram of a computer that may be configured as a host or server, for example, to function as the application or authentication server in the system of FIG. 1.

FIG. 7 is a simplified functional block diagram of a retail kiosk or other work station or terminal device.

DETAILED DESCRIPTION

Figure 1:
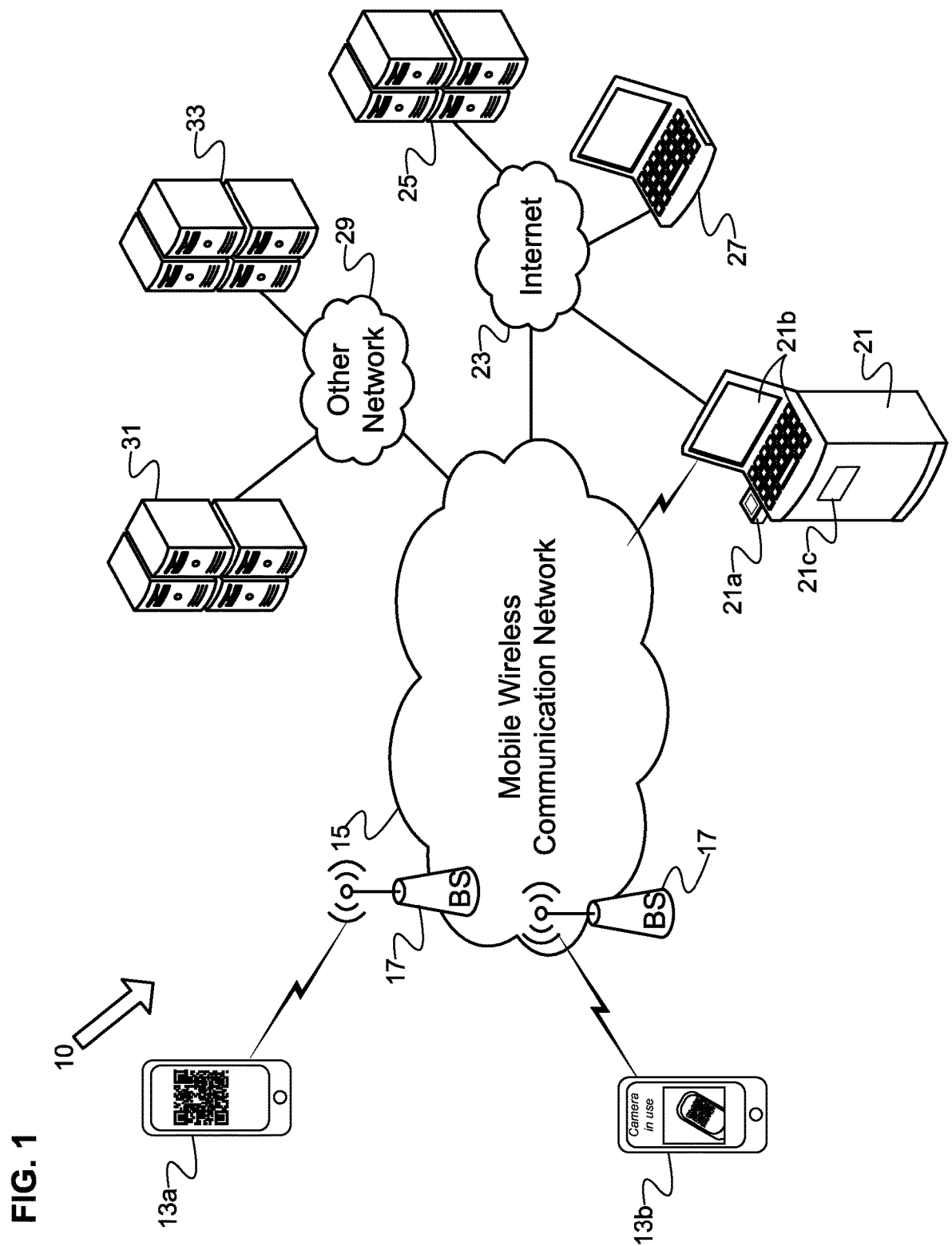
FIG. 1 is a high-level functional block diagram of an illustrative system of networks/devices providing communications for mobile devices and retail kiosks in support of the dynamic quick response (QR) code generation service.

In the following detailed description, numerous specific details are set forth by way of examples in order to provide a thorough understanding of the relevant teachings. In other instances, methods, procedures, components, and/or circuitry have been described at a relatively high-level, without detail, in order to avoid unnecessarily obscuring aspects of the present teachings.

The various methods and systems disclosed herein relate to dynamic generation of quick response (QR) codes for secure communication to/from a mobile device.

In one example, the QR code is used to identify a product or service requested by a user from a retail kiosk, such as an automated kiosk that dispenses DVDs of movies and other media for rental to users. The QR code additionally identifies an account of the user, such that payment for the product or service can automatically be charged using payment information associated with the identified user account. As such, the user need not use an interface of the retail kiosk or present a payment card to obtain the product or service. Instead, the user accesses an application associated with the retail kiosk on the user's mobile device, and selects a product or service to obtain from the kiosk (e.g., a particular movie for rental). In addition, the application prompts the user to log in to a user account having associated payment information, or user account information is retrieved by the application from a memory of the mobile device. The application generates the QR code to identify the user account and the selected product or service. In response to the generated QR code being presented to the retail kiosk, the kiosk processes the QR code to identify the user account and selected product or service, and automatically provides the selected product or service to the user upon obtaining payment from the user account.

In another example, the QR code is used to transfer money and/or credits between a user and a retailer, or between two users. In a transfer involving a user and a retailer, a payment application on a user's mobile device generates a QR code identifying an account of the user. A QR reader, such as a QR reader of a retail kiosk, reads and processes the QR code to identify the account of the user.

Payment to the user's account (e.g. a deposit of credit into the user's account) or payment from the user's account (e.g. a withdrawal of credit from the user's account) is processed, resulting in the user's account balance being updated based on the processed payment. In the case of a payment from the user's account, the generated QR code can additionally and optionally identify the amount to be paid or deducted from the account, and/or a maximum amount authorized for the transaction.

In a transfer between two users, a payment application is executed on each user's mobile device. The receiver user's application generates a QR code identifying an account of the user receiving the payment (i.e., the receiver user). The payer user's application reads the receiver user's QR code, and processes the received QR code. The payer user's application then generates a message identifying the receiver user's account based on the QR code, and including an amount to be paid. The message is transmitted to an application server associated with the payment application to enable authorization of the transaction and updating of the receiver and payer users' account balances to reflect the payment based on the amount to be paid.

The QR codes provide a relatively secure form of communication between devices as use of a QR code generally require a straight-line visual link to be established between a QR code displayer and a QR code reader. Users of the device can thus ensure security of the communication by visually ascertaining whether any eavesdropping devices are within visual range and alignment to the QR code displayer. In contrast, for example, near-field communication (NFC) based exchanges can be intercepted or eavesdropped upon by any device within range of an NFC emitter, whether or not such devices are visible or hidden. Identifying or locating any devices eavesdropping on NFC communication may thus be more difficult.

In addition, in various examples, QR codes may be encrypted such that at least one of the identifier for the user account and the identifier for the selection by the user are encrypted. The encryption can include a time-based encryption, such that the encrypted information and/or the QR code are only valid for a limited period of time. The encryption can include a single-use encryption, such that the encrypted information and/or the QR code are only valid for a single use. More generally, the encryption can ensure that only devices having a matching decryption key can obtain the user account, user selection, or other information encrypted in the QR code.

The QR code can be generated by the application executing on the mobile device alone, e.g. based on programming instructions stored by a memory of the mobile device. In other examples, the QR code can be generated by an application server in communication with the application executing on the mobile device, and received from the application server in the application executing on the mobile device.

In addition to the components described above, application server(s) may provide the various mobile devices' applications with information on products and services offered by retail kiosks, and with user account balance information. The application server(s) may further receive updated information on products and services from retail kiosks, and provide user authentication for the retail kiosks.

Reference now is made in detail to the examples illustrated in the accompanying drawings and discussed below.

FIG. 1 illustrates a system 10 offering a variety of mobile communication services, including communications for dynamically generating QR codes for secure communication from/to mobile devices. The example shows simply two mobile devices 13a and 13b as well as a mobile wireless communication network 15. The mobile devices 13a and 13b (referenced generally as mobile device(s) 13) are examples of devices that may be used for the QR code generating service. However, the network will provide similar communications for many other similar users as well as for mobile devices/users that do not participate in the service. The system additionally includes a retail kiosk 21 configured to interact with mobile devices 13 of the network 15. The network 15 provides mobile wireless communications services to those stations as well as to other mobile devices (not shown), for example, via a number of base stations (BSs) 17. The retail kiosk may communicate through the mobile wireless network 15 directly using a mobile wireless communication transceiver, or through another network (e.g., Internet 23) and a gateway interconnecting the networks 15 and 23. The present techniques may be implemented in any of a variety of available mobile networks 15 and/or on any type of mobile device compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile devices 13 may be capable of voice telephone communications through the network 15, and for the QR code generating services, the exemplary devices 13a and 13b are capable of data communications through the particular type of network 15.

The network 15 allows users of the mobile devices such as 13a and 13b (and other mobile devices not shown) to initiate and receive telephone calls to each other as well as through a public switched telephone network. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile devices 13 via the Internet 23 may be with devices like those shown at 25 and 27 as well as with a variety of other types of devices or systems capable of data communications through various interconnected networks. The mobile devices 13a and 13b of users of the QR code generating service also can receive and execute applications written in various programming languages, as discussed more detail below.

The retail kiosk 21 may be one of a plurality of retail kiosks operative to interact with users and users' mobile devices using QR codes dynamically generated by the users' mobile devices. For such purposes, the retail kiosk 21 includes a QR reader 21a operative to scan and/or read QR codes placed within its line of sight, such as QR codes displayed on a mobile device 13 placed on the reader. The QR reader 21a may be a camera, a bar code reader, or another appropriate peripheral device. The retail kiosk 21 can additionally include a user interface 21b including a user input interface (e.g., keyboard, mouse, touch-screen, microphone, or the like) and a user output interface (e.g., display, speaker, or the like) used for interacting with users, for receiving user input, and for providing notifications and other output to users. The retail kiosk 21 can optionally include a dispenser 21c configured to provide products to users of the kiosk (e.g., a DVD that is rented through the kiosk, a coffee that is purchased through the kiosk, or the like). In some examples, the kiosk 21 includes an input port for receiving products provided by users, such as a coin input port, a bottle return port, or the like.

Mobile devices 13 can take the form of portable handsets, smart-phones, or personal digital assistants, although they may be implemented in other form factors. Program applications, including an application to assist in the QR generating service and/or an application purchased via the retail kiosk can be configured to execute on many different types of mobile devices 13. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system.

The mobile devices 13 generally include a camera that can be used to capture images including images of QR codes (see, e.g., device 13b). A mobile device 13 executing a QR reader application can use the camera as a QR reader to obtain or scan a QR code. The QR reader application then processes the QR code to retrieve information encoded therein. The mobile devices 13 further include a display device operative to display QR codes (see, e.g., device 13a) that can be read by a QR reader 21a of a retail kiosk 21 or a QR reader of another mobile device (e.g., 13b).

The mobile wireless communication network 15 includes a traffic network, represented generally by the cloud at 15, which carries user communications and data for the mobile devices 13 and/or retail kiosk 21 between base stations 17 and other elements with or through which the mobile devices communicate. A carrier of the mobile wireless communication network 15 will operate a number of systems that provide ancillary functions in support of the communications services and/or application services provided through the network 15, and those elements communicate with other nodes or elements of the network 15 via one or more private IP type packet data networks 29 (sometimes referred to as an Intranet), i.e., a private networks. Generally, such systems are part of or connected for communication via the private network 29. Examples of such systems, in this case operated by the network service provider as part of the overall network 10, which communicate through the intranet type network 29, include one or more application servers 31 (e.g., retail application servers, payment application servers, or the like) and a related authentication server 33 for the application services of servers 31. The authentication server 33 may be configured to authenticate mobile devices 13 and retail kiosk 21, applications running on the mobile devices and/or retail kiosk, or the like. The authentication server 33 may further provide encryption-related services, such as the generation, distribution, and/or authentication of encryption keys including encryption/decryption key pairs.

A mobile device 13 communicates over the air with a base station 17 and through the traffic network 15 for various voice and data communications, e.g. through the Internet 23 with a server 25 and/or with application servers 31. A kiosk 21 may communicate over the air with a base station 17 and through the traffic network 15 for various data communications, or via a wired connection (e.g., LAN or Ethernet connection) or wireless connection (e.g. Wi-Fi) through the Internet 23 with server 25 and/or 31. If the mobile service carrier offers the dynamic QR code generation service, the service may be hosted on a carrier operated application server 31, for communication via the networks 15 and 29. Alternatively, the dynamic QR code generation service may be provided by a separate entity (alone or through agreements with the carrier), in which case, the service may be hosted on an application server such as server 25 connected for communication via the networks 15 and 23. Servers such as 25 and 31 may provide any of a variety of common application or service functions in support of or in addition to an application programs running on the mobile device 13 and/or retail kiosk 21. However, for purposes of further discussion, we will focus on functions thereof in support of the dynamic QR code generation service. For a given service, including the QR code generation service, an application program within the mobile device 13 may be considered as a 'client' and the programming at 25 or 31 may be considered as the 'server' application for the particular service. An application program within the retail kiosk 21 may also be considered as a 'client' with respect to the 'server' programming at 25 or 31.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the application server (server 31 in our example) receives a service request from a client application on a mobile device 13 or a kiosk 21, the application server provides appropriate information to the authentication server 33 to allow authentication server 33 to authenticate the mobile device 13 and/or kiosk 21 as outlined herein. Upon successful authentication, the server 33 informs the server application 31, which in turn provides access to the service via data communication through the various communication elements (e.g. 29, 15 and 17) of the network 10. A similar authentication function may be provided for QR code generation service(s) offered via the server 25, either by the server 33 if there is an appropriate arrangement between the carrier and the operator of server 25, by a program on the server 25 or via a separate authentication server (not shown) connected to the Internet 23.

FIG. 2 is a flow diagram illustratively showing steps of a method 200 for dynamically generating a QR code for secure communication to/from a mobile device.

As part of method 200, a mobile device 13 generates a QR code for use in communication with a kiosk 21 or another mobile device 13, in which the QR code encodes an identifier for a user account and an identifier for a user request. The method begins with the mobile device beginning execution of an application configured to generate the QR code in step 201. In one example, the application is an application associated with a retail kiosk and configured to generate QR codes for communication with the retail kiosk. The application may be associated with a same retailer as the retail kiosk to which the QR code will be presented; alternatively, the application may be an application configured to generate QR codes for interfacing with multiple different retailers' kiosks, such as an application for selecting movies for rental that can be used with movie rental kiosk provided by multiple different vendors.

The mobile device receives, in the application, identification of a user account in step 203. The device may receive the user account information by prompting the user for an account identifier such as a username, and/or log-in information such as a password. The device may alternatively or additionally retrieve user account information from a memory of the mobile device, for example in situations in which the user has previously provided the account identifier, log-in, and/or other information. The device may further, in response to receiving or retrieving the account identifier and/or log-in information, verify the account information with an application server associated with the application and/or a retail kiosk. The verification can include authenticating the account identifier and log-in information with the application server by transmitting the information to application server, and receiving an authentication confirmation from the application server following verification that the received information matches information stored by the application server. Processing of further steps in the method may be interrupted or blocked if the authentication is not successful. The device may additionally retrieve account information from the application server. The retrieved account information can, in some examples, include an account balance. In general, the account stores payment information associated with the account, such as a credit card or other payment card associated with the account, a credit balance associated with the account, or the like. The payment information is generally stored by the application server, though the payment information can additionally or alternatively be stored by the mobile device in different embodiments.

The mobile device additionally receives, in the application, selection by a user for a product or service in step 205. The selection may correspond to a product or service to be received by the user from the retail kiosk 21. In general, the selection is received in response to the application displaying on the mobile device a catalog or other listing of products and/or services offered through the application and/or kiosk. The catalog and listing information may be stored in memory of the mobile device and retrieved from the memory. Alternatively or additionally, catalog and/or listing information can be retrieved by the application from an application server or Internet-connected server through a data communication connection of the mobile device 13. In one example, the selection is for multiple products and/or services. In another example, the selection includes selection of a product or service, as well as selection of various options for the product or service. For instance, the selection may be for a dark roast coffee to be obtained from a coffee-vending kiosk, and the options may include selection of one or more of milk, sugar, caramel, mocha, and/or other additives to the coffee.

In response to the selection, the application executing on the mobile device generates a QR code encoding an identifier for the user account and an identifier for the user selection in step 207. Additional information may further be encoded into the QR code, such as the time and/or date at which the QR code was generated or a user selection was received, a location at which the QR code was generated or a user selection was received, or the like. In general, the QR code is generated by the application executing on the mobile device alone, e.g. based on programming instructions stored by a memory of the mobile device. The programming instructions may include an algorithm for encoding the identifier for the user account and the identifier for the user selection within the QR code, and the processor of the mobile device may thus execute the algorithm in order to generate the QR code. In other examples, the QR code can be generated at least in part by an application server in communication with the application executing on the mobile device, and in such examples, the QR code is received at least in part from the application server in the application executing on the mobile device.

In some examples, following receipt of the user selection in step 205 and/or prior to the generation of the QR code in step 207, the application generates an order confirmation prompt and displays the prompt for the user on a display screen of the mobile device. The confirmation prompt can include information on the user selection received from the user (e.g., a list of products and/or services selected by the user). Optionally, the confirmation prompt also includes information on the user account currently in use, and/or on the payment method to be used to complete the order. Further processing of the order (e.g., the generation of the QR code in step 207) may only proceed in response to receiving a user selection confirming the transaction. Note that in other examples, the confirmation prompt is generated and displayed to the user at a later time in method 200. For example, the confirmation prompt may be generated and displayed on the retail kiosk as part of step 217, so as to obtain confirmation for the transaction prior to completing the transaction in step 219.

Once the QR code is generated, the application running on the mobile device displays the QR code on a display screen of the mobile device in step 209. In some examples, the application running on the mobile device may provide additional functionality to the user, such as a search function for locating the retail kiosks 21 that are nearest to a current location of the mobile device (e.g., a current location of the mobile device determined based on GPS or other location-determination functionality of the mobile device), that are nearest and offer the product and/or service selected by the user in step 205, or are nearest to another location selected by the user. In response to the mobile device being placed by a user in front of a QR reader, such as a QR reader of the retail kiosk 21, the QR code displayed on the mobile device is read by the QR reader in step 211. The QR code, as read by the reader, can then be processed for use by the retail kiosk 21.

In steps 213 and 215, the read QR code is processed in order to retrieve the identifier for the user account and the identifier for the user selection. Each of the identifiers may be encoded separately within the QR code (e.g., in different regions or different pixels within the QR code), and may thus be retrieved independently. Alternatively, the identifiers may be encoded together within the QR code, and may thus be retrieved in a same extraction operation. In general, the extraction is performed by a processor of the retail kiosk 21. However, if the retail kiosk 21 has limited processing capabilities, at least part of the extraction can be performed by an application server associated with the kiosk.

In examples in which additional information such as time/date and/or location information is encoded into the QR code, the additional information is extracted from the QR code in steps 213 and 215. The additional information can be used for verification purposes, for example to verify that the QR code was generated within a particular period of time (e.g., the previous week period) or within a particular geography (e.g., within 50 miles of the retail kiosk), and thereby detect suspicious and/or fraudulent uses of QR codes. In some embodiments, QR codes generated outside of the period of time or geography may thus be considered invalid. The additional information can further be used by the retail kiosk and/or a retailer to learn about user behaviors and thereby enhance the retail experience provided to the user. For example, in response to determining that users typically generate QR codes when located in or near a coffee shop, the retailer may decide to install a retail kiosk in the coffee shop.

In response to the retail kiosk identifying the user account, optional procedures for verifying and/or authenticating the transaction can be performed at step 217. The authentication can include the application on the mobile device (or the application server having processed the read QR code) communicating with an authentication server in order to authenticate the user account information extracted from the QR code. The verification can include the application on the mobile device (or the application server) verifying that sufficient credits or funds are available through the user account for the selected product or service, or processing payment for the selected product or service using payment information associated with the account. The verification can further include verifying that the user account has permission to obtain the selected product or service. For example, the application server may block a user account in which a suspicious pattern of behavior is observed, such as a user account associated with a large number of transactions in a pre-determined time period, a user account involved in a large number of denied transactions, or the like. The number of transactions triggering the account block can be transaction dependent, retailer dependent, or the like. The user account block may be removed automatically after expiration of a pre-determined time-out period, or in response to the user contacting an administrator of the application. Also, the application server may further keep track of the number of movies currently on loan for each user account, and the verification may involve determining whether an excessive number of movies are currently on loan. If the number of movies currently on load exceeds a threshold, the user account may be blocked from obtaining any additional movies. The user account may additionally or alternatively store information for restricting the types or ratings of movies that can be rented through the account, and the verification process can include verifying that a selected movie abides by the restriction imposed on the account. Changes to user account restrictions may be made through the mobile device application or the retail kiosk by providing a password for the user account.

If the verification/authentication is successful, the retail kiosk 21 provides the user with the product or service selected by the user through the application running on the mobile device 13 in step 219, based on the retrieved identifier for the selection communicated through the QR code. In particular, the product or service is automatically provided to the user without the user having to use a user interface of the retail kiosk to identify or select the product or service. In examples in which at least some of the processing of the QR code in steps 213-217 is performed by an application server associated with the kiosk, the step 219 is performed in response to receiving an instruction from the application server to provide the product or service to the user.

The method 200 (and/or the other methods described herein) may be repeatedly and/or sequentially performed on the mobile device. As such, following the displaying of the QR code in step 209, the mobile device may return to step 203 or step 205 to enable the user to select another user account and/or another product or service, such that the mobile device can generate another QR code in step 207. The mobile device may additionally proceed to another method (e.g., 300 or 350) to generate the other QR code. In general, the other QR code generated in each iteration of the method (200, 300, 350) will be different from QR codes generated in previous instances of the method (200, 300, 350) because of a different user account selection, different product or service selection, and/or change in encryption used in the QR code.

Figure 3A:
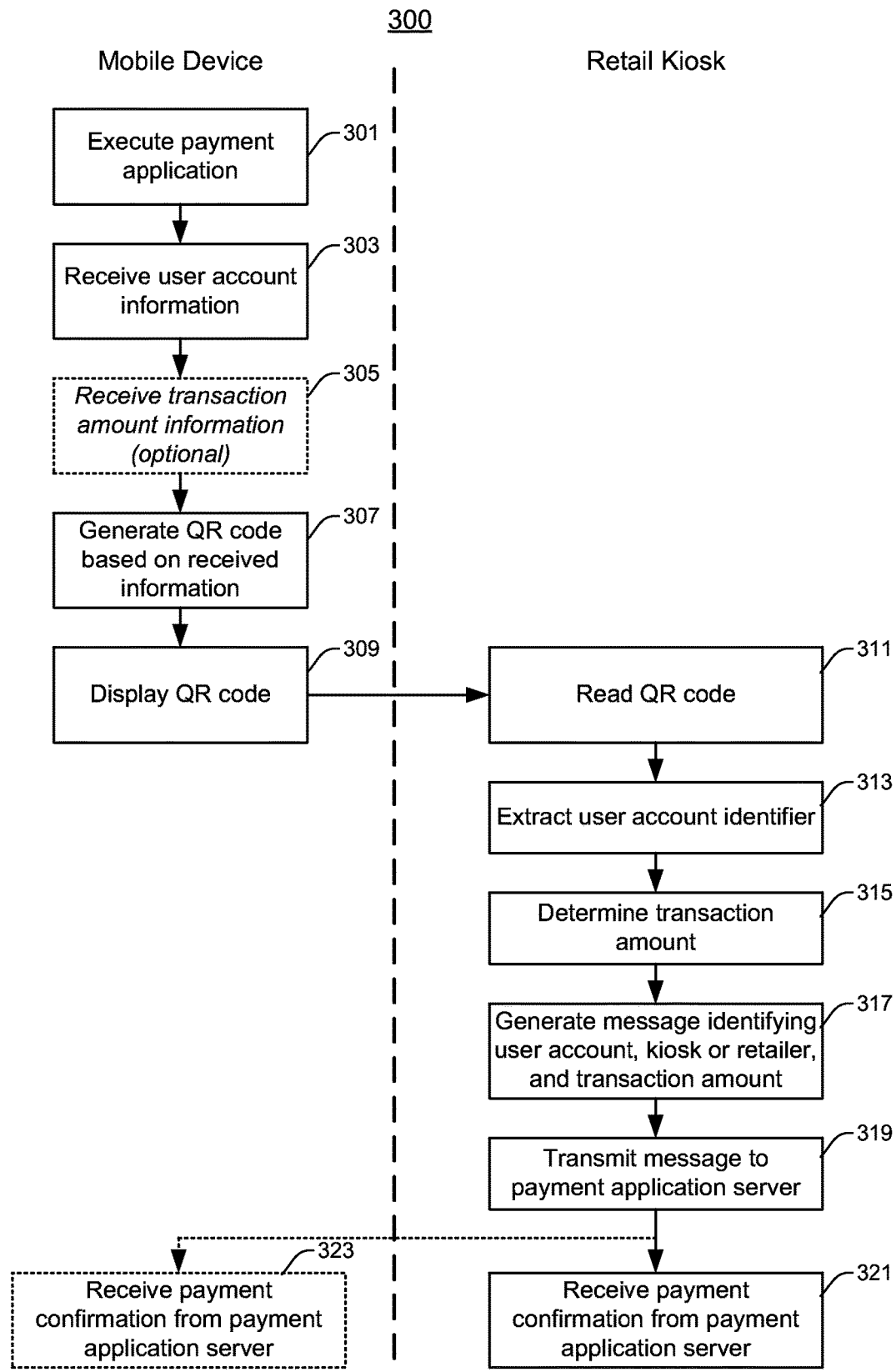
FIG. 3A is a flow diagram illustratively showing steps of a method for dynamically generating of a QR code for securely transferring money and/or credits between a user and a retailer.

FIG. 3A shows a flow diagram illustratively showing steps of a method 300 for dynamically generating of a QR code for securely transferring money and/or credits between a user and a retailer. Several steps of method 300 are similar to corresponding steps of method 200, and reference can be made to the description of the corresponding steps of method 200 for additional detailed information.

The method 300 begins with the mobile device 13 beginning execution of a payment application in step 301. The mobile device 13 receives, in the application, identification of a user account in step 303. The identification of the user device may be substantially similar to step 203 of method 200, and reference can be made to the description of step 203 for further detail. In method 300, the user account generally has an associated balance which is stored by a payment application server associated with the application. The balance is generally positive, but may be negative in examples in which a credit line is associated with the user account. The user account may further have a bank account, credit card, debit card, or the like associated with the user account. The associated bank account and/or other information can be used to process payments. Specifically, the bank account and/or other information can further be used to enable positive balances to be transferred to the bank account or cards and funds to be obtained from the bank account or cards.

Optionally, the mobile device may receive, in the application, selection by a user of a transaction amount as part of a payment transaction in step 305. The transaction amount can be positive or negative, depending on whether the payment transaction is for a credit to or debit from the user's account. In one example, the user is prompted for a transaction amount in the case of a debit transaction from the user's account, while the user is not prompted for a transaction amount in the case of a credit transaction to the user's account. In some examples, the transaction amount is a pre-authorization amount selected by the user (i.e., a maximum amount that the user authorizes for debit/credit as part of a particular payment transaction), and the pre-authorization amount may thus exceed the final amount of the transaction that will be processed with the retail kiosk 21 as part of method 300. In situations in which the mobile device application has retrieved a current balance of the user account (e.g., from the payment application server or from memory), the user may only be allowed to select a transaction amount that is equal to or less than the current balance. In situations in which the user's account has an associated credit line, the user may only be allowed to select a transaction amount that is equal to or less than the credit line, or than the sum of the current balance and the credit line.

In response to the selection, the payment application executing on the mobile device generates a QR code encoding an identifier for the user account and, optionally, identification of the transaction amount in step 307. Once the QR code is generated, the payment application running on the mobile device displays the QR code on a display screen of the mobile device in step 309. In response to the mobile device being placed by a user in front of a QR reader, such as a QR reader of the retail kiosk 21, the QR code displayed on the mobile device is read by the QR reader in step 311. The QR code, as read by the reader, can then be processed for use by the retail kiosk 21.

In steps 313 and 315, the read QR code is processed in order to retrieve the identifier for the user account and, optionally, the transaction amount. In some situations, the transaction amount is determined by the retail kiosk. For example, in the case of a bottle-return kiosk or a coin-collecting kiosk, the transaction amount (generally a credit to the user account) is determined by the kiosk based on the number and/or types of bottles and coins inserted by the user. In the case of a movie-rental kiosk, the transaction amount (generally a debit from the user account) is determined by the kiosk based on the movies selected by the user for rental through a user interface of the kiosk or through other appropriate means. If the transaction amount determined by the kiosk exceeds a pre-authorization amount provided by the user, a notification is provided to the user indicating that additional funds are needed or that special user authorization is needed (e.g., by prompting the user for approval of the excess amount, by obtaining payment information from the user for the excess amount, or the like). In other situations, the transaction amount is determined by the user. For example, in the case of a user wanting to deposit funds into the user account, the user selects the transaction amount in step 305 and the selected amount is encoded within the QR code generated in step 307. Alternatively, the user may select the transaction amount through a user interface of the retail kiosk in step 315, and the transaction may be approved provided it does not exceed any pre-authorization amount associated with the transaction.

Once the kiosk 21 identifies the user account (in step 313) and the transaction amount (in step 315), the retail kiosk generates in step 317 a message identifying the user account, identifying the transaction amount, and identifying the kiosk 21, a retailer, or an account of the kiosk or retailer with the payment application server. Optionally, the message can include verification and/or authentication information, such as that discussed in relation to step 217 above.

The generated message is transmitted from the kiosk 21 to the payment application server in step 319 to enable the payment application server to process the payment transaction. The payment application server verifies and/or authenticates the received message and the information contained therein and authorizes the payment if the verification/authentication is successful. Processing of the payment can include verifying the identity of the retail kiosk or retailer identified in the message received by the payment application server in step 319, to ensure that the message is received from an approved and authenticated detail kiosk. Processing of the payment can further include verifying the identity of the user account identified in the message received by the payment application server, and obtaining payment information associated with user account. Processing of the payment can further include processing of the payment using the obtained payment information, by updating a balance of the user account, submitting a payment request to a payment card or bank account associated with the user account, or the like.

In steps 321 and 323, the payment application server transmits payment confirmation messages to the retail kiosk 21 and, optionally, to the mobile device 13, providing confirmation that the payment has been processed. The confirmation may include the transaction amount, identification of the user account used to complete the transaction and, optionally, a remaining balance of the user account. The payment application server thus enables processing of payments to the user's account (e.g. a deposit of credit into the user's account) or payments from the user's account (e.g. a withdrawal of credit from the user's account), and maintains an updated user account balance based on processed payments.

FIG. 3B shows a flow diagram illustratively showing steps of a method 350 for dynamically generating of a QR code for securely transferring money and/or credits between two mobile device users. In the case of money transfers between users, payment applications are executed on both users' mobile devices 13a, 13b as detailed below. Several steps of method 350 are similar to corresponding steps of methods 200 and/or 300, and reference can be made to the description of the corresponding steps of methods 200 and 300 for additional detailed information.

In method 350, the mobile device 13a of the receiver of the payment executes the payment application (step 351), and receives user account information for the account of the receiver of the payment (step 353). The payment application running on the receiver's mobile device generates a QR code encoding an identifier for the receiver's user account in step 355. The generated QR code is displayed on the device in step 357.

In parallel with steps 351-357, the mobile device 13b of the payer executes the payment application (step 359), and receives user account information for the account of the payer (step 361). In step 363, the payment application running the payer's mobile device 13b can additionally prompt the user (payer) to select a transaction amount corresponding to the amount to be transferred or paid to the receiver. In step 365, the QR reader of the payer's mobile device 13b is activated. The QR reader can take the form of a camera, and activation of the QR reader may include activating the camera within the payment application executing on the payer's mobile device 13b. Once the QR reader is activated, the receiver's mobile device 13a is placed in front of the QR reader, such as the QR reader of the payer's mobile device 13b can read the QR code displayed by the receiver's mobile device 13a.

In response to the QR code being read, the payment application on the payer's mobile device 13b processes the QR code in step 367. The read QR code is processed in order to retrieve the identifier for the receiver's user account from the QR code. Once the payer's application identifies the receiver's user account, the application generates in step 369 a message identifying the receiver's user account, the payer's user account, and the transaction amount. Optionally, the message can include verification and/or authentication information, such as that discussed in relation to step 217 above. The verification and/or authentication can include authenticating the payer's mobile device and/or the payer's user account in order to ensure that the payment from the payer's user account is an authorized payment.

The generated message is transmitted from the payer's mobile device to the payment application server in step 371 to enable the payment application server to process the payment transaction. The payment application server verifies and/or authenticates the received message and the information contained therein and authorizes the payment if the verification/authentication is successful. In steps 373 and 375, the payment application server transmits payment confirmation messages to the payer's and to the receiver's mobile devices providing confirmation that the payment has been processed. The confirmation may include the transaction amount and, optionally, the remaining balance of each respective user's account. The payment application server thus enables processing of payment into the receiver's account (e.g. a deposit of credit into the receiver's account) from the payer's account (e.g. a withdrawal of credit from the payer's account), and maintains an updated user account balance based on processed payments.

In order to make the use of the QR codes more secure, the QR codes can use encryption. As such, an application executing on a mobile device and generating a QR code may store an encryption key or may obtain an encryption key from an application server or an authentication server. The encryption key may be an application-specific encryption key, a user account-specific or mobile device-specific encryption key, or any other encryption key. The encryption key may be obtained by the application executing on the mobile device from an application server or authentication server, and stored on the mobile device for current and/or future use. In one example, the encryption key is obtained from an application server and is a retail-kiosk-specific encryption key. In the one example, the application executing on the mobile device receives a user selection of a retail kiosk from which the product or service (method 200) or payment (method 300) will be requested, and retrieves from the application server an encryption key corresponding to the selected retail kiosk for encryption of the QR code generated in step 207 or 307. The retail kiosk from which the product or service or payment will be requested can alternatively automatically be identified by determining a current location of the mobile device, and determining the nearest retail kiosk to the mobile device. Alternatively, the application executing on the mobile device computes the encryption key for encryption of the QR code based on information obtained about the retail kiosk (such as information on location of the kiosk, obtained from the application server or from a GPS or other locating circuitry on the mobile device), based on information obtained about the transaction (such as whether the transaction includes a newly released product, a classic product, or the like), and/or based on information about the user account (such as whether the user account is a normal or preferred user account).

The device, server, or application processing the read QR code and extracting identifiers from the QR code, such as the retail kiosk (e.g., methods 200 and 300) or the payer's mobile device (method 350), then uses a decryption key corresponding to the encryption key to decrypt the information encoded in the QR code during processing of the read QR code. In situations in which the encryption key is an applications-specific encryption key or a kiosk-specific encryption key, the application processing the read QR code may store the corresponding decryption key or may retrieve the decryption key from an application server. In situations in which the encryption key is a user-account specific or mobile device-specific encryption key, the application processing the read QR code obtains the corresponding decryption key from the authentication server. In situations in which the encryption key is retail-kiosk-specific, the application processing the read QR code obtains the decryption key from a memory of the retail kiosk. Alternatively, the application processing the QR code transmits the QR code, or encrypted information extracted to the QR code, to the authentication server for decryption and receives from the authentication server the decrypted information.

In some situations, time-sensitive encryption keys are used. Time-sensitive encryption ensures that the encrypted information can only be decrypted during a pre-determined time window, such as a limited time window following the time of encryption. In one example, the time-sensitive encryption key may ensure that the QR code can only be decrypted and used during a predetermined amount of time (say a 2 minute time period) following the generation of the QR code, and that the QR code becomes invalid following the expiration of the time window. This time may be set to be reasonable considering the type of interaction and allow for other user issues (e.g., interruptions) that may occur when using the QR code. In the case of time-sensitive encryption keys, the application or mobile device generating the QR code may obtain an encryption key having a time-limited validity from the application server or authentication server. Alternatively, the application or mobile device generating the QR code may generate the time-sensitive encryption key based on a pre-stored encryption key and a precise timing source (e.g., a precise clock, such as a clock synchronized to the mobile communication network's time base, synchronized to a GPS-satellite time base, or the like). The application processing the read QR code obtains the corresponding time-sensitive decryption key from the application server or authentication server, or generates the corresponding time-sensitive decryption key from a pre-stored decryption key and the same precise timing source as used in generating the corresponding time-sensitive encryption key.

In some situations, single-use QR codes are used. In the case of a single-use QR code, the application processing the read QR code verifies with the application server or the authentication server whether the QR code has previously been used. If the QR code has not previously been used, the application processing the read QR code proceeds with the extraction of information encoded in the QR code and the further processing steps.

In the case of method 300, the application running on the mobile device may be configured to generate an non-encrypted QR code in situations in which the transaction amount corresponds to a credit transaction to the user's account, and may only generate an encrypted QR code in situations in which the transaction amount corresponds to a debit transaction from the user's account. The determination may be made based on the sign of the transaction amount (positive or negative) obtained in step 305.

FIG. 4 shows a flow diagram illustratively showing steps of a method 400 for using an encrypted QR code for securely communicating to/from a mobile device. Method 400 includes several steps, including steps 401 (execute retail/payment application), 413 (display QR code), and 415 (read QR code) that are substantially similar to corresponding steps of methods 200, 300, and/or 350. In the methods 200, 300, and/or 350, the mobile device(s) and/or retail kiosk may perform the steps of method 400 in order to use encrypted QR codes.

In method 400, the retail kiosk 21, payer mobile device 13b, or other device executing the application that will process or extract the QR code generates an encryption/decryption key pair in step 403. Alternatively, the device may obtain an encryption/decryption key from the authentication server, the application server, or another appropriate source. The device generates a QR code in step 405 that encodes or otherwise includes the encryption key of the encryption/decryption key pair. The generated QR code is referred to as a QR encryption code. The QR encryption code is displayed by the device in step 407, and read by the mobile device 13a in step 409. The mobile device 13a processes the QR encryption code in order to extract the encryption key that is encoded therein.

The encryption key obtained from the QR encryption code can thus be used to encrypt the information included within the QR code generated by the mobile device in step 411, such as the information included within QR codes generated in any of steps 207, 307, and/or 355. Further, the device having generated the encryption key stores the corresponding decryption key. Hence, upon reading the QR code in step 415, the device can decrypt the read QR code (and/or the information embedded within the read QR code) using the corresponding decryption key in step 417. The decrypted information can then be used in further process steps following step 417.

In the example of method 400, the encryption/decryption key pair may be used for a single transaction only. As such, upon completing step 411, the mobile device 13*a* may discard or erase from memory the encryption key. Furthermore, upon completing step 417, the device processing the QR code may discard or erase from memory the encryption/decryption key pair. A new encryption/decryption key pair can then be generated for each future communication transaction between the retail kiosk 21 or mobile device 13*b* and mobile device 13*a*.

The dynamic QR code generation service under consideration here may be delivered to a variety of different types of mobile devices. Implementation of the QR code generation service will involve at least some execution of programming in the mobile devices as well as implementation of user input/output functions and data communications through the network 15, from the mobile devices.

Figure 5:
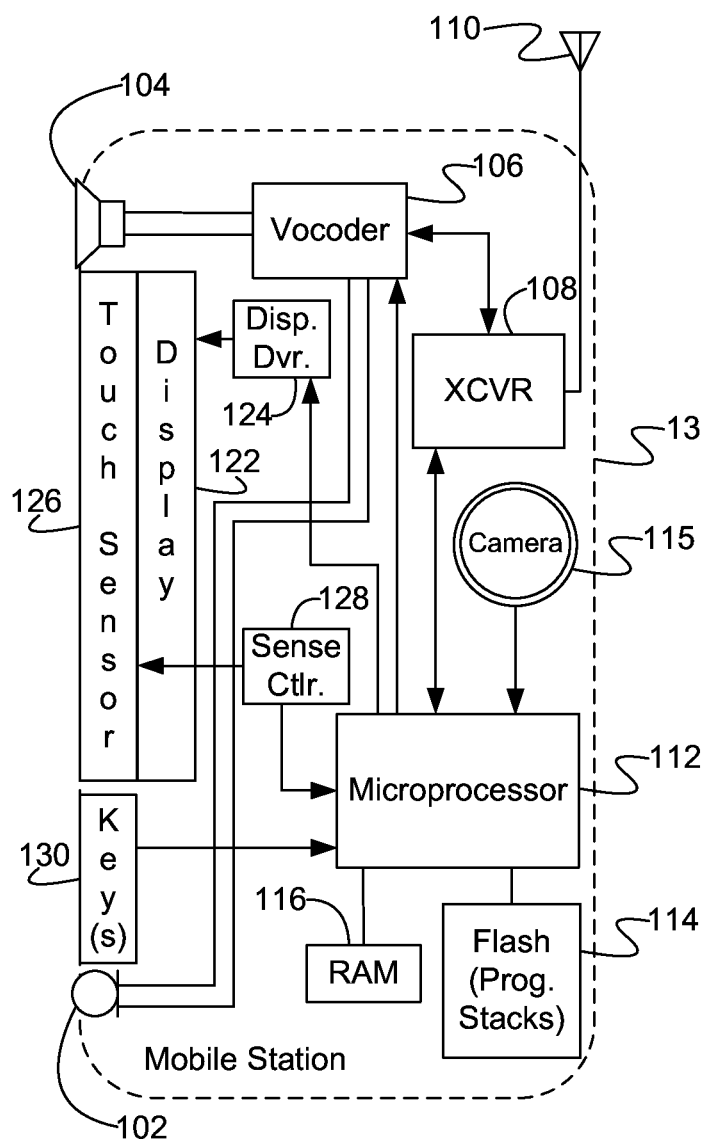
FIG. 5 is a high-level functional block diagram of an exemplary mobile device as may use the dynamic QR code generation service through a network/system like that shown in FIG. 1.

For purposes of such a discussion, FIG. 5 provides a block diagram illustration of an exemplary mobile device 13. Although the mobile device 13 may be a smart-phone or may be incorporated into another device, such as a personal digital assistant (PDA) or the like, for discussion purposes, the illustration shows the mobile device 13 is in the form of a handset. The handset embodiment of the mobile device 13 functions as a normal digital wireless telephone. For that function, the device 13 includes a microphone 102, speaker 104, and voice coding and decoding circuitry (vocoder) 106 for audio signal input and output.

For digital wireless communications, the device 13 also includes at least one digital transceiver (XCVR) 108 connected to antenna 110. Today, the device 13 would be configured for digital wireless communications using one or more of the common network technology types. The concepts discussed here encompass embodiments of the mobile device 13 utilizing any digital transceivers that conform to current or future developed digital wireless communication standards. The mobile device 13 may also be capable of analog operation via a legacy network technology. The mobile device 13 may include multiple transceiver configured for communication over different network types (e.g., Wi-Fi, mobile, or the like).

The mobile device 13 includes a display 118 for displaying messages, menus or the like, application display screens, etc., including dynamic QR codes generated by applications executing on the device 13. Key(s) 130, touch sensor 126, and sense controller 128 provide a user input interface for receiving user selections and commands. The display 118, keys 130, and touch sensor 126 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

The mobile device 13 additionally includes one or more cameras 115 used to capture static and/or video images. The camera 115 can, in particular, be used to capture images of QR codes for processing by a QR reader application running on the mobile device 13. The camera provides captured image data to the processor 112 for storage in memory (e.g., 114, 116) and/or processing.

In addition to normal telephone and data communication related input/output (including message input and message display functions), the user interface elements also may be used for display of menus and other information to the user and user input of selections, including any needed during dynamic generation of QR codes.

A microprocessor 112 serves as a programmable controller for the mobile device 13, in that it controls all operations of the mobile device in accord with programming that it executes, for all normal operations, and for operations involved in the QR-related functionalities under consideration here. In the example, the mobile device 13 includes flash type program memory 114, for storage of various "software" or "firmware" program routines and mobile configuration settings. The mobile device 13 may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software, short message service software, retail application and payment application software, and the like. The memories 114, 116 also store various data, such as telephone numbers and server addresses, downloaded data such as multimedia content, and various data input by the user such as user account configuration data. Programming stored in the flash type program memory 114, sometimes referred to as "firmware," is loaded into and executed by the microprocessor 112.

As outlined above, the mobile devices 13 includes a processor, and programming stored in the flash memory 114 configures the processor so that the mobile device is capable of performing various desired functions, including in this case the functions involved in the technique for providing QR-related functions described in relation to methods 200, 300, 350, and 400.

As shown by the above discussion, functions relating to the dynamic generation of QR codes, via a graphical user interface of a mobile device and a retail kiosk, may be implemented on computers connected for data communication via the components of a packet data network as shown in FIG. 1. Although special purpose devices may be used, such devices also may be implemented using one or more hardware platforms intended to represent a general class of data processing device commonly used to run "server" programming so as to implement the retail application server and authentication server functions discussed above, albeit with an appropriate network connection for data communication.

A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for storing user account information in the application server or other server. The software code is executable by the general-purpose computer that functions as the application server and/or that functions as a mobile device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for dynamically generating and processing QR codes for secure communication to/from mobile devices, in essentially the manner performed in the implementations discussed and illustrated herein.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a retail kiosk 21 (e.g., a retail kiosk including a QR code reader) or other type of work station or terminal device, although the computer of FIG. 7 may also act as a server if appropriately programmed.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The server functions may be implemented in a distributed fashion on a number of similar platforms, to distribute the processing load.

Hence, aspects of the methods for dynamically generating and processing QR codes for secure communication to/from mobile devices outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the retailer into the computer platform that will be the application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the various memories shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
receiving, in a mobile device executing a retail application, selection of a product or service by a user of the mobile device;
generating, in the mobile device and based on the received user selection of the product or service, a first quick response (QR) code encoding identification of the selected product or service, identification of a user account of the user of the mobile device, and a location at which the QR code is being encoded;
providing a search function, in the mobile device, for locating one or more retail kiosks within a specific geographical location of the mobile device;
reading, using a camera of the mobile device, a second QR code displayed by a retail kiosk selected by the user from the one or more retail kiosks, the second QR code encoding an encryption key;
processing, in the mobile device, the second QR code read using the camera in order to extract the encryption key encoded in the second QR code;
encrypting, in the mobile device, the first QR code into an encrypted QR code using the encryption key extracted from the second QR code read by the camera; and
displaying, by the mobile device, the encrypted QR code in a format to be communicated to a QR reader of the selected retail kiosk;
wherein the location at which the first QR code was encoded is configured to be extracted from the encrypted QR code to verify that the first QR code was encoded within a particular geographical area of the selected retail kiosk.

2. The method of claim 1, wherein the selected product or service is provided by the selected retail kiosk without the user identifying the product or service through a user interface of the selected retail kiosk.

3. The method of claim 1, wherein the retail application and the selected retail kiosk are associated with a same retailer.

4. The method of claim 1, further comprising:
obtaining, in the mobile device from an application server associated with the retail application, information on a plurality of products or services offered by a retailer through the selected retail kiosk; and
displaying, on a display screen of the mobile device, the obtained information on the plurality of products and services offered by the retailer through the selected retail kiosk, wherein the selection of the product or service by a user of the mobile device is received through a user interface of the mobile device in response to the displaying of the obtained information.

5. The method of claim 1, wherein the generating of the first QR code in the mobile device comprises transmitting, from the mobile device to an application server in communication with the retail application, the received selection of the product or service, and receiving data for generating the first QR code encoding identification of the selected product or service from the application server.

6. The method of claim 1, further comprising:
reading, by a QR reader of the selected retail kiosk, the encrypted QR code displayed by the mobile device; and
processing, by the retail kiosk, the encrypted QR code read by the QR reader in order to extract identification of the product or service and identification of the user account encoded in the encrypted QR code, wherein the product or service provided by the retail kiosk is the product or service identified by the identification extracted from the encrypted QR code.

7. The method of claim 1, wherein the selected retail kiosk comprises an automated kiosk configured for dispensing one or more products.

8. The method of claim 1, further comprising prompting the user to log into the user account to retrieve the identifier for the user account before generating the first QR code.

9. The method of claim 8, wherein the user account has associated payment information for the user.

10. A method comprising:
receiving, in a mobile device executing a payment application, user account information;
generating, in the mobile device and based on the received user account information, a first quick response (QR) code encoding identification of the user account of the user of the mobile device, and a location at which the first QR code is being encoded;
providing a search function, in the mobile device, for locating one or more devices for processing a payment transaction within a specific geographical location of the mobile device;
reading, using a camera of the mobile device, a second QR code displayed by one of the one or more devices for processing a payment transaction, the second QR code encoding an encryption key;
processing, in the mobile device, the second QR code read using the camera in order to extract the encryption key encoded in the second QR code;
encrypting, in the mobile device, the first QR code into an encrypted QR code using the encryption key extracted from the second QR read by the camera;
displaying, by the mobile device, the encrypted QR code in a format to be read by a QR reader of the one of the one more devices for processing a payment transaction; and
receiving, from a payment application server associated with the payment application, a payment confirmation message in response to the one of the one more devices for processing the payment transaction successfully completing a payment transaction based on the user account identification encoded in the displayed encrypted QR code;
wherein the location at which the first QR code was encoded is configured to be extracted from the encrypted QR code to verify that the first QR code was generated within a particular geographical area of the one of the one more devices for processing a payment transaction before processing the payment transaction.

11. The method of claim 10, further comprising:
authenticating, by the mobile device, the received user account information by communicating the received information to a payment application server associated with the payment application, wherein the generating the first QR code is performed in response to receiving an authentication confirmation from the payment application server.

12. The method of claim 10, further comprising:
receiving, in the mobile device, selection of a transaction amount by a user of the mobile device, wherein generating the first QR code comprises encoding identification of the user account and identification of the selected transaction amount.

13. The method of claim 10, wherein the encrypted QR code is valid for a limited time period.

14. The method of claim 10, wherein the encrypted QR code comprises a single-use encryption.

15. A method comprising:
displaying, by a device for processing a payment transaction a first quick response (QR) code, for reading by a mobile device, wherein the first QR code encodes an encryption key;
reading, by a QR code reader of the device for processing the payment transaction, a second QR code displayed by the mobile device, wherein the second QR code is encrypted using the encryption key read by the mobile device;
processing, by the device for processing the payment transaction, the second QR code read by the QR reader in order to extract identification, encoded in the second QR code, of a user account of a user of the mobile device and of a location at which the second QR code was encoded, wherein processing the second QR code read by the QR reader comprises decrypting information encoded in the second QR code using a decryption key corresponding to the encryption key encoded in the first QR code displayed for reading by the mobile device;
verifying, by the device for processing the payment transaction, that the location at which the second QR code was encoded is within a particular geographical area of a location of the device for processing the payment transaction;
generating a payment transaction request message, in the device for processing the payment transaction, the payment transaction request message including the identification of the user account extracted from the second QR code and a transaction amount;
transmitting the generated payment transaction request message, from the device for processing the payment transaction to a payment application server; and
receiving, at the device for processing a payment transaction, from the payment application server, a payment confirmation message in response to the payment application server successfully completing a payment transaction based on the user account identification extracted from the second QR code.

16. The method of claim 15, wherein the processing the second QR code comprises extracting identification of the transaction amount encoded in the second QR code, and wherein the generating the payment transaction request message comprises generating the payment transaction request message including the identification of the transaction amount extracted from the second QR code.

17. The method of claim 15, wherein the processing the second QR code comprises extracting identification of a maximum transaction amount encoded in the second QR code, the method further comprising:
computing, in the device for processing the payment transaction, a transaction amount;
comparing the computed transaction amount to the maximum transaction amount extracted from the second QR code; and
upon determining that the transaction amount is less than the maximum transaction amount extracted from the second QR code, generating the payment transaction request message including the identification of the user account extracted from the second QR code and the computed transaction amount.

18. The method of claim 15, further comprising:
authenticating, by the device for processing the payment transaction, the user account identified by the identification extracted from the second QR code by transmitting the extracted identification of the user account to an authentication server,
wherein the receiving the payment confirmation message comprises receiving the payment confirmation message only upon the authentication server successfully authenticating the user account.

19. The method of claim 15, wherein the second QR code identifies the transaction amount.

20. The method of claim 15, wherein the second QR code identifies a maximum amount authorized for the payment transaction.

* * * * *